United States Patent
Kim et al.

(10) Patent No.: US 10,016,816 B2
(45) Date of Patent: Jul. 10, 2018

(54) CHUCK FOR MOUNTING WORKPIECE

(71) Applicant: KHAN WORKHOLDING CO., LTD, Changwon-si, Gyeongsangnam-do (KR)

(72) Inventors: Do Hoon Kim, Busan (KR); Kyung Soo Shin, Asan-si (KR)

(73) Assignee: KHAN WORKHOLDING CO., LTD, Changwon-si (KR)

( * ) Notice: Subject to any disclaimer, the term of this patent is extended or adjusted under 35 U.S.C. 154(b) by 0 days.

(21) Appl. No.: 14/421,224

(22) PCT Filed: Aug. 9, 2013

(86) PCT No.: PCT/KR2013/007200
§ 371 (c)(1),
(2) Date: Feb. 12, 2015

(87) PCT Pub. No.: WO2014/027801
PCT Pub. Date: Feb. 20, 2014

(65) Prior Publication Data
US 2015/0202691 A1    Jul. 23, 2015

(30) Foreign Application Priority Data
Aug. 13, 2012    (KR) .................. 10-2012-0088477

(51) Int. Cl.
*B23B 31/12*    (2006.01)
*B23B 31/16*    (2006.01)

(52) U.S. Cl.
CPC ........ *B23B 31/16* (2013.01); *B23B 31/16279* (2013.01); *B23B 2222/04* (2013.01); *B23B 2231/32* (2013.01); *Y10T 279/19* (2015.01)

(58) Field of Classification Search
CPC .............. B23B 31/16; B23B 31/16279; B23B 2222/04; B23B 2231/32; Y10T 279/19
See application file for complete search history.

(56) References Cited

U.S. PATENT DOCUMENTS

| | | | | |
|---|---|---|---|---|
| 2,513,284 A | * | 7/1950 | Church | ................. B23B 31/00 279/123 |
| 2,597,489 A | * | 5/1952 | Huntting | ........... B23B 31/16004 279/114 |
| 3,515,400 A | | 6/1970 | Jendry | |
| 7,963,527 B2 | * | 6/2011 | Weller | ................ B23B 31/1627 279/110 |

FOREIGN PATENT DOCUMENTS

| | | |
|---|---|---|
| JP | 59-192404 A | 10/1984 |
| JP | 61-008209 A | 1/1986 |
| KR | 10-2007-0091256 A | 9/2007 |

OTHER PUBLICATIONS

International Search Report for PCT/KR2013/007200 dated Nov. 18, 2013 from Korean Intellectual Property Office.

* cited by examiner

*Primary Examiner* — Daniel Howell
*Assistant Examiner* — Paul M Janeski
(74) *Attorney, Agent, or Firm* — Paratus Law Group, PLLC (57) ABSTRACT

A chuck for mounting workpiece is disclosed. A chuck for mounting workpiece includes a chuck body; and a base jaw mounted on the chuck body. The chuck body includes an aluminum alloy. The chuck body includes an aluminum alloy having specific gravity smaller than that of alloy steel for machining structural use or carbon steel for machine structure use. Thus, the chuck can be light weight.

7 Claims, 9 Drawing Sheets

FIG. 9

CHUCK FOR MOUNTING WORKPIECE

CROSS REFERENCE TO PRIOR APPLICATION

This application is a National Stage Patent Application of PCT International Patent Application No. PCT/KR2013/007200 (filed on Aug. 9, 2013) under 35 U.S.C. § 371, which claims priority to Korean Patent Application No. 10-2012-0088477 (filed on Aug. 13, 2012) which are all hereby incorporated by reference in their entirety.

TECHNICAL FIELD

The present invention relates to a chuck for mounting a workpiece, and more particularly, to a chuck for mounting a workpiece having reduced weight.

BACKGROUND ART

A lathe is the most used machine tool among machine tools for mechanically machining a workpiece. The lathe may classified into a general lathe (a manual lathe) being manually operated, and a numerically-controlled lathe and a computerized numerically-controlled lathe being automatically operated.

Particularly, a computerized numerical-controlled lathe called a CNC lathe is a machine tool where a controller is mounted to the general lathe. The computerized numerically-controlled lathe can automatically perform a machining of various components according to a program.

The computerized numerically-controlled lathe includes a controller that is an electronic device being able to automatically operate an apparatus and an apparatus body that is a mechanical device. The controller controls an operation of the apparatus body by a CNC (computer numerical control) system program, a PLC (programmable logic control) program, and so on. The apparatus body includes a head stock, a chuck, a tool post, a tail stock, a bed, a carriage, a feed gear (a transfer saddle), a hydraulic device, like the general lathe.

In this instance, a chuck for the lathe is mounted at an end of a main spindle and grips a workpiece. The chuck may be a general chuck, a pneumatic chuck, a hydraulic chuck, a collet chuck, a magnetic chuck, and so on. Generally, the chuck grips the workpiece by interlocked movements of three or four jaws.

On the other hand, the chuck may be mostly manufactured from alloy steel for machining structural use or carbon steel for machine structure use. However, the alloy steel for machining structural use or the carbon steel for machine structure use has a specific gravity of about 7.77. Thus, the material of the alloy steel for machining structural use or the carbon steel for machine structure use is heavy, a volume of an apparatus (a machine tool) for the same is large, and power consumption increases. Thus, machining process using the chuck is inefficient.

In addition, inertia load applied to a motor of the apparatus is large when the chuck includes the heavy material, especially in high speed machining. Thus, it is hard to be used for a long time.

DISCLOSURE

Technical Problem

The present invention is for providing a chuck being able to reduce the weight of the chuck.

The objects of the present invention is not limited to the above object, and the other objects of the present invention will be understood by the person skilled in the art from the below descriptions.

Technical Solution

The invention has been made in an effort to provide a chuck for mounting workpiece including a chuck body; and a base jaw mounted on the chuck body. The chuck body includes an aluminum alloy.

Also, the chuck body may include at least one guide portion guiding a movement of the base jaw, and the chuck further may include a reinforcement portion positioned at an area of the guide portion.

Further, the chuck body may include at least one guide portion guiding a movement of the base jaw, the guide portion may include a sliding portion guiding the base jaw so that the base jaw moves, and the chuck further may include a reinforcement portion positioned at an area of the sliding portion.

In addition, the reinforcement portion may include a first reinforcement portion and a second reinforcement portion, and each of the first reinforcement portion and the second reinforcement portion may include an inner side surface and an outer side surface.

Also, the first reinforcement portion may include a first horizontal reinforcement portion and a second horizontal reinforcement portion, the second reinforcement portion may include a vertical reinforcement portion, the first horizontal reinforcement portion may be connected to one side of the vertical reinforcement portion, and the second horizontal reinforcement portion may be connected to the other end of the vertical reinforcement portion.

Further, the outer side surface of the reinforcement portion further may include a depressed portion and a protruded portion.

In addition, the chuck may further include an aluminum oxide layer formed on an outer surface of the chuck body.

ADVANTAGEOUS EFFECTS

According to an embodiment of the invention, a chuck body includes an aluminum alloy having specific gravity smaller than that of alloy steel for machining structural use or carbon steel for machine structure use. Thus, the chuck can be light weight.

Accordingly, a size and an installation space of an apparatus (a machine tool) can be reduced by a reduced weight of the chuck. The load applied to the apparatus can be reduced, and thus, power consumption can be reduced and lifespan of the apparatus can be increased.

In addition, a reinforcement portion positioned at a predetermined area of a sliding portion is included. Therefore, strength or stiffness of the sliding portion can be increased by the reinforcement portion.

DETAILED DESCRIPTION OF THE EMBODIMENTS

The advantages and technical features, and structures for achieving them of the invention will be clarified with reference to embodiments that are described in detail along with accompanying drawings. However, the invention is not limited the flowing embodiments and is achieved by various structures, types, and shapes. The following embodiments will be just described for illustrative purposes to those skilled in the art. The scope and spirit of the invention as disclosed in the accompanying claims.

Hereinafter, specific contents for carrying out the invention will be described with reference to accompanying drawings. The same reference numeral indicates the same element regardless of the drawings. With respect to the elements referred using the term of "and/or", each of the elements and all possible combinations of the elements are included in the invention.

Although the term of "first", "second", and so on are used for describing various elements, the invention is not limited thereto. The terms are used only to discriminate one element from another element. Thus, a first element may be a second element in the scope of the invention.

The terms used in this specification is just to describe embodiment, not to limit the scope of the invention. In the specification, an element written by a singular form includes an element or a plural of elements unless otherwise specifically stated. The terms of "comprise" and/or "include" do not exclude any existence or possibility of one or more other elements, structures, characters, steps, or combinations thereof.

Unless there are different definitions, all terms used hereto (including technical terms and scientific terms) have the meanings same as those generally understood by the skilled in the art. Also, the term generally used in dictionaries are not understood ideally or excessively unless otherwise specifically stated.

The terms of "below", "beneath", "lower", "above", "upper" that are relative terms related to positions in a space may be used to easily describe relationships between one element and another element. The relative terms related to the positions in the space may be understood to include directions different form the direction shown in the drawings when the element is used or operated, along with the direction shown in the drawings.

For example, an element "below" or "beneath" another element will be the element "above" the another element when the light-left reverse of the drawing is operated. The term of "below" or "beneath" may include the meaning of "on" along with the meaning of "below" or "beneath". Elements may be oriented in a direction different form the direction of the drawings. Thus, the relative terms related to the positions may be understood considering the orientation of the element.

Hereinafter, with reference to accompanying drawings, embodiments of the present invention will be described in detail.

Figure 1:
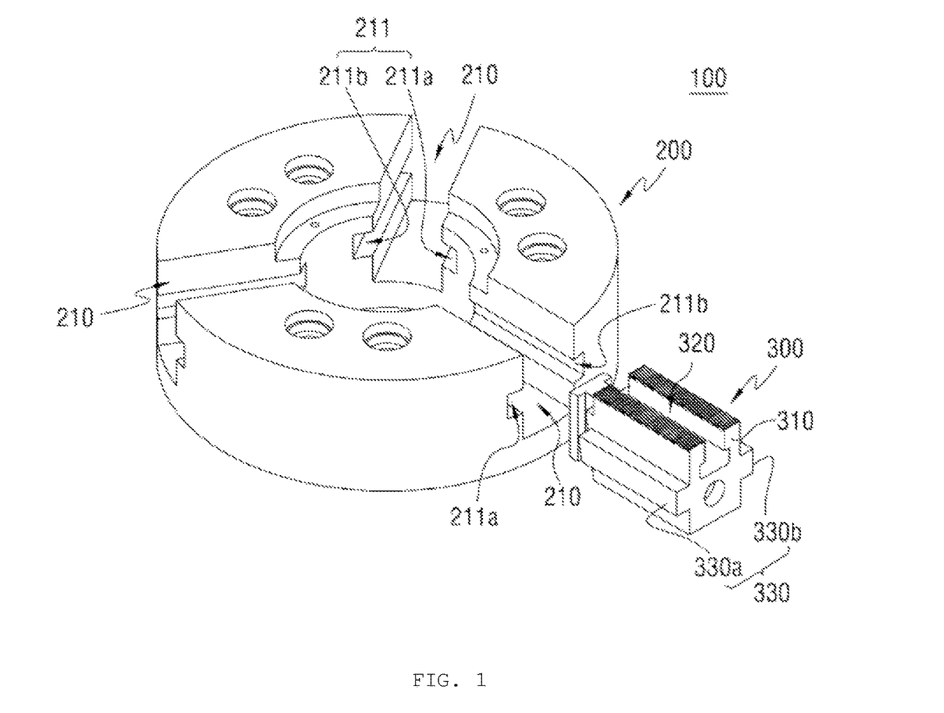
FIG. 1 is an exploded perspective view of a chuck for mounting a workpiece according to a first embodiment of the invention.
Figure 2:
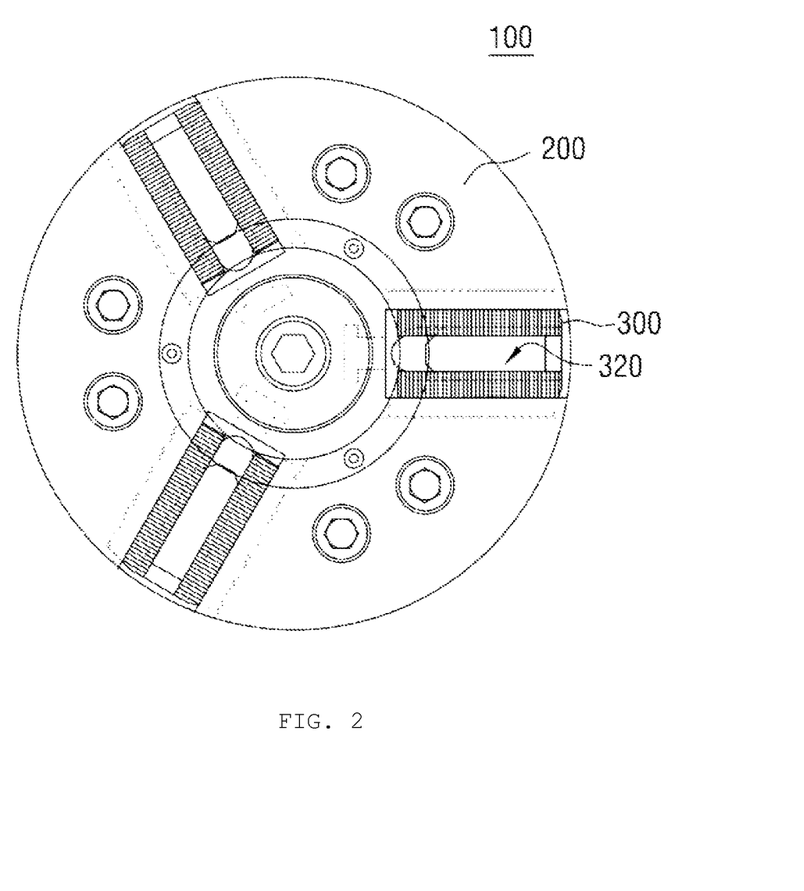
FIG. 2 is an assembled plan view of the chuck for mounting the workpiece according to the first embodiment of the invention.

FIG. 1 is an exploded perspective view of a chuck for mounting a workpiece according to a first embodiment of the invention. FIG. 2 is a plan view of the chuck for mounting the workpiece according to the first embodiment of the invention. For the convenience, one chuck is shown in FIG. 1 with respect to the chuck that will be described later, and a state that three chucks are assembled are shown in the plan view of FIG. 2.

A chuck 100 for mounting a workpiece according to an embodiment of the invention is installed at a predetermined end of a main spindle (not shown) of a lathe, and is rotated along with the main spindle while gripping a workpiece.

First, referring to FIG. 1 and FIG. 2, a chuck 100 for mounting a workpiece according to a first embodiment of the invention includes a chuck body 200 and a base jaw (base jaws) 300. The chuck body 200 is installed at a predetermined end of a main spindle and is rotated along with the main spindle. The base jaw 300 includes a plurality of base jaws 300 on the chuck body 200, and moves in a radial direction on the chuck body 200.

The chuck body 200 constitutes a basic body of the chuck 100 for mounting the workpiece according to the invention. Although it is not shown in FIGS. 1 and 2, the chuck body 200 may be installed at an end of a main spindle (not shown) of a general lathe (a manual lathe), a numerically-controlled lathe, or a computerized numerically-controlled lathe and may be rotated along with the main spindle.

In addition, the chuck body 200 includes at least one guide portion 210 for guiding a movement of the base jaw 300. The guide portion 210 may include a plurality of guide portions 210 at regular intervals.

Although the number of the guide portions is three in FIGS. 1 and 2, the number of the guide portions may be at least two. Therefore, the invention is not limited the number of the guide portion.

The guide portion 210 may include a sliding portion 211 for supporting a support portion 330 of the base jaw 300 and guiding the base jaw 300 so that the base jaw 300 can move.

The sliding portion 211 may include a first sliding portion 211a positioned at a first side of the guide portion 210 and a second sliding portion 211b positioned at a second side of the guide portion 210. The base jaw 300 may move along the guide portion 210 in a state that a first support portion 330a of the base jaw 300 is in contact with the first sliding portion 211a and a second support portion 330b of the base jaw 300 is in contact with the second sliding portion 211b.

With reference to FIG. 1 and FIG. 2, the base jaw 300 moves in the radial direction on the chuck body 200 and enables the after-mentioned top jaw 350 to move. The base jaw 300 may be movably installed at the guide portion 210 of the chuck body 200.

The base jaw 300 includes a body portion 310, a fastened portion 320, and the support portion 330. The body portion 310 constitutes a body of the base jaw 300. The fastened portion 320 is positioned at a predetermined area of the body portion 310 and is configured to be fastened to the after-mentioned T-nut 340. The support portion 330 is extended or protruded from the body portion 310 and supports the body portion 310.

The support portion 330 includes a first support portion 330a extended or protruded from a first side of the body portion 310 and a second support portion 330b extended or protruded from a second side of the body portion 310. As described in the above, the base jaw 300 moves along the guide portion 210 in the state that the first support portion 330a of the base jaw 300 is in contact with the first sliding portion 211a and the second support portion 330b of the base jaw 300 is in contact with the second sliding portion 211b.

On the other hand, although it is not shown, the base jaw 300 may move along the guide portion 210 to an inner side or to an outer side in the radial direction by mechanical interlocks such as a pneumatic pressure, a hydraulic press, or a scroll. This is a well-known in a general lathe (a manual lathe), a numerically-controlled lathe, and a computerized numerically-controlled lathe, and thus, detail descriptions will be omitted.

That is, the base jaw 300 transfers the after-mentioned top jaw 350 to the inner side or to the outer side in the radial direction. The base jaw 300 may include various elements known in the general lathe (the manual lathe), the numerically-controlled lathe, and the computerized numerically-controlled lathe.

In this instance, the chuck body 200 may include an aluminum alloy. That is, the chuck body 200 may be the aluminum-based alloy.

The aluminum alloy may be 60 series aluminum alloy (6000 series aluminum alloy) or 70 series aluminum alloy (7000 series aluminum alloy). However, the embodiment of the invention is not limited to a kind, a type, a series of the aluminum alloy.

Examples of the 60 series aluminum alloy or the 70 series aluminum alloy are shown in following Table 1.

| JIS | Si | Fe | Cu | Mn | Mg | Cr | Zn | Ti | Al |
|---|---|---|---|---|---|---|---|---|---|
| 6003 | 0.37~1.0 | 0.6 | 0.1 | 0.8 | 0.8~1.5 | 0.35 | 0.2 | 0.1 | the rest |
| 6061 | 0.4~0.8 | 0.7 | 0.15~0.4 | 0.15 | 0.8~1.2 | 0.04~0.35 | 0.25 | — | the rest |
| 6063 | 0.2~0.6 | 0.35 | 0.1 | 0.1 | 0.45~0.9 | 0.1 | 0.1 | 0.1 | the rest |
| 7003 | 0.3 | 0.35 | 0.2 | 0.3 | 0.5~1.0 | 0.2 | 5.0~6.5 | 0.2 | the rest |
| 7072 | 0.7 | 0.7 | 0.1 | 0.1 | 0.1 | — | 0.8~1.3 | — | the rest |
| 7075 | 0.4 | 0.5 | 1.2~2.0 | 0.3 | 2.1~2.9 | 0.18~0.28 | 5.1~6.1 | 0.2 | the rest |

As described in the above, the conventional chuck is mostly manufactured from alloy steel for machining structural use or carbon steel for machine structure use. However, the alloy steel for machining structural use or the carbon steel for machine structure use has a specific gravity of about 7.77. Thus, the material of the alloy steel for machining structural use or the carbon steel for machine structure use is heavy, a volume of an apparatus (a machine tool) for the same is large, and power consumption increases. Thus, machining process using the chuck is inefficient.

On the other hand, according to an embodiment of the invention, the chuck body 210 includes the aluminum alloy having specific gravity smaller than that of the alloy steel for machining structural use or the carbon steel for machine structure use. Thus, the chuck 100 can be light weight.

Accordingly, a size and an installation space of an apparatus (a machine tool) can be reduced by a reduced weight of the chuck. The load applied to the apparatus can be reduced, and thus, power consumption can be reduced and lifespan of the apparatus can be increased.

Also, high speed machining is necessary to perform the machining of difficult-to-cut special materials such as aircraft parts. A most important factor of the high speed machining is a weight of an object. The chuck body 210 according to the embodiment includes the aluminum alloy being lightweight, and thus, the high speed machining can be easy.

Further, since the aluminum alloy has machinability better than that of the alloy steel for machining structural use or the carbon steel for machine structure use, productivity of the chuck can be enhanced.

Figure 3:
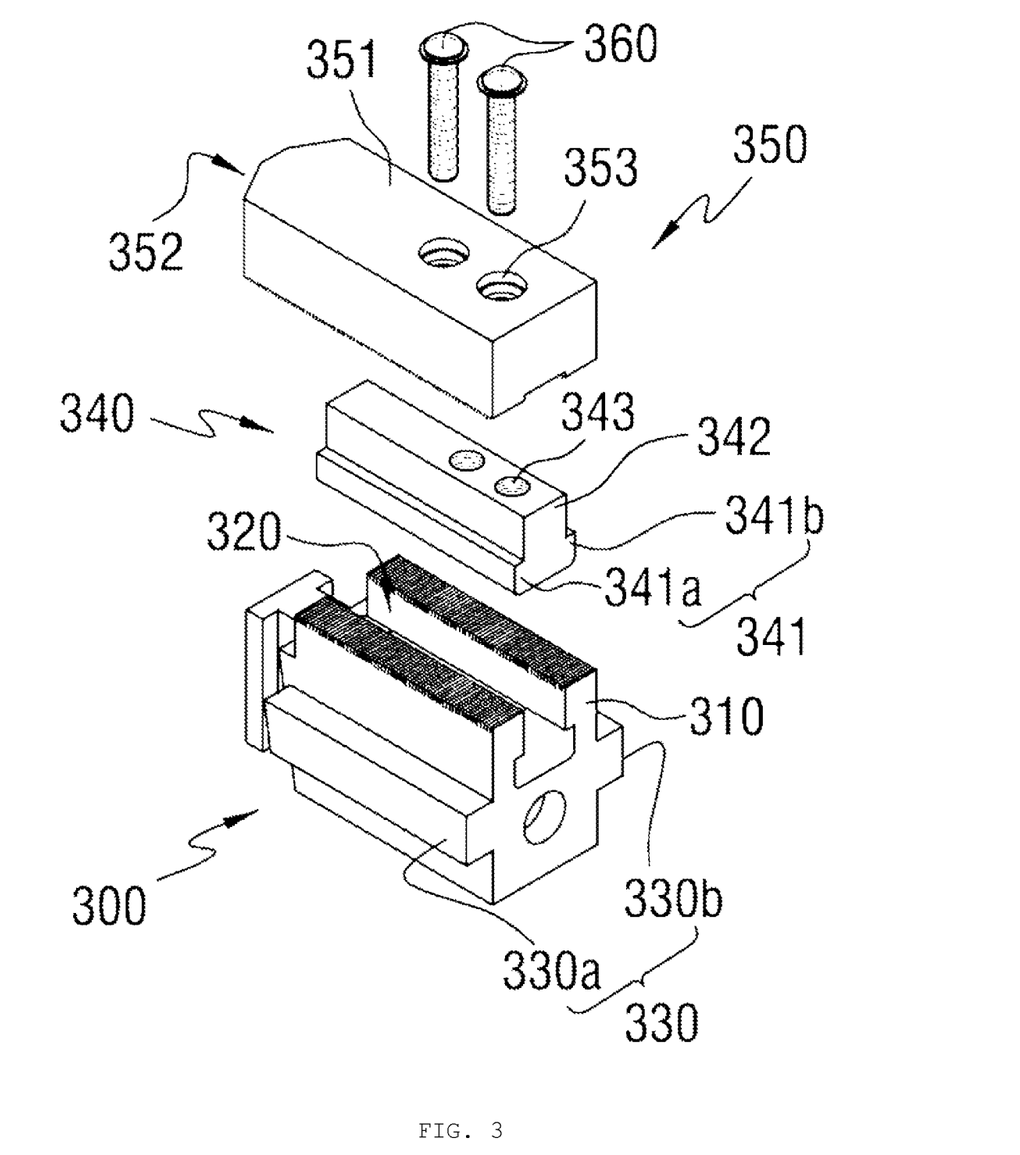
FIG. 3 is an exploded perspective view illustrating an example of a base jaw and a top jaw of the chuck for mounting the workpiece according to the first embodiment of the invention.
Figure 4:
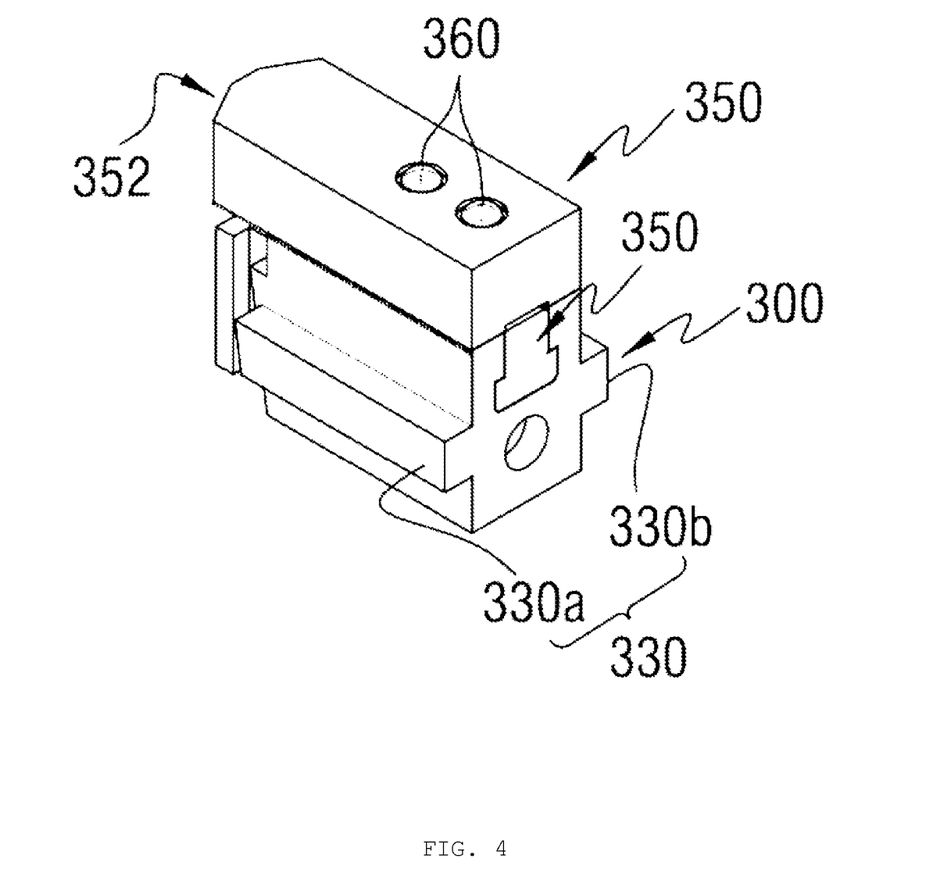
FIG. 4 is an assembled perspective view illustrating the example of the base jaw and the top jaw of the chuck for mounting the workpiece according to the first embodiment of the invention.

FIG. 3 is an exploded perspective view illustrating an example of a base jaw and a top jaw of the chuck for mounting the workpiece according to the first embodiment of the invention. FIG. 4 is an assembled perspective view illustrating the example of the base jaw and the top jaw of the chuck for mounting the workpiece according to the first embodiment of the invention.

Referring to FIG. 3 and FIG. 4, a chuck 100 for mounting a workpiece according to a first embodiment of the embodiment includes a base jaw 300 and a top jaw 350. The chuck 100 may include a T-nut 340 for fastening or coupling the base jaw 300 and the top jaw 350 to each other.

As described in the above, the base jaw 300 includes a body portion 310, a fastened portion 320, and a support portion 330. The body portion 310 constitutes a body of the base jaw 300. The fastened portion 320 is positioned at a predetermined area of the body portion 310 and is configured to be fastened to the T-nut 340. The support portion 330 is extended or protruded from the body portion 310 and supports the body portion 310. The support portion 330 includes a first support portion 330a extended or protruded from a first side of the body portion 310 and a second support portion 330b extended or protruded from a second side of the body portion 310.

Also, the top jaw 350 includes a body portion 351, a grip portion 352, and a fastening hole 353. The body portion 351 constitutes a body of the top jaw 350. The grip portion 352 grips the workpiece or releases the grip of the workpiece. The fastening hole 353 is for being fastened with the T-nut 340.

Further, the T-nut 340 includes a body portion 342, protrusions 341a, 341b, and 341, and a fastening recess 343. The body portion 342 constitutes a body of the T-nut 340. The fastened portion 320 of the base jaw 300 is fastened to the protrusions 341a, 341b, and 341. The fastening recess 343 is for being fastened with the fastening hole 353 of the top jaw 350.

That is, the protrusions 341a, 341b, and 341 of T-nut 340 are inserted to and supported by the fastened portion 320 of the base jaw 300, and the fastening hole 353 of the top jaw 350 and the fastening recess 343 of the T-nut 340 are fastened by a screw or a bolt 360. The T-nut 340 fastens or couple the top jaw 350 and the base jaw 300 to each other.

On the other hand, an example of the base jaw 300 and the top jaw 350 is shown. The base jaw 300 and the top jaw 350 may be an integration structure. In addition, the base jaw 300 and the top jaw 350 may be fastened by the T-nut 340 to each other. Selectively, the base jaw 300 and the top jaw 350 may be simply fastened without the T-nut 340. Therefore, the embodiment is not limited to the structures of the base jaw 300 and the top jaw 350.

MODE FOR INVENTION

Figure 5:
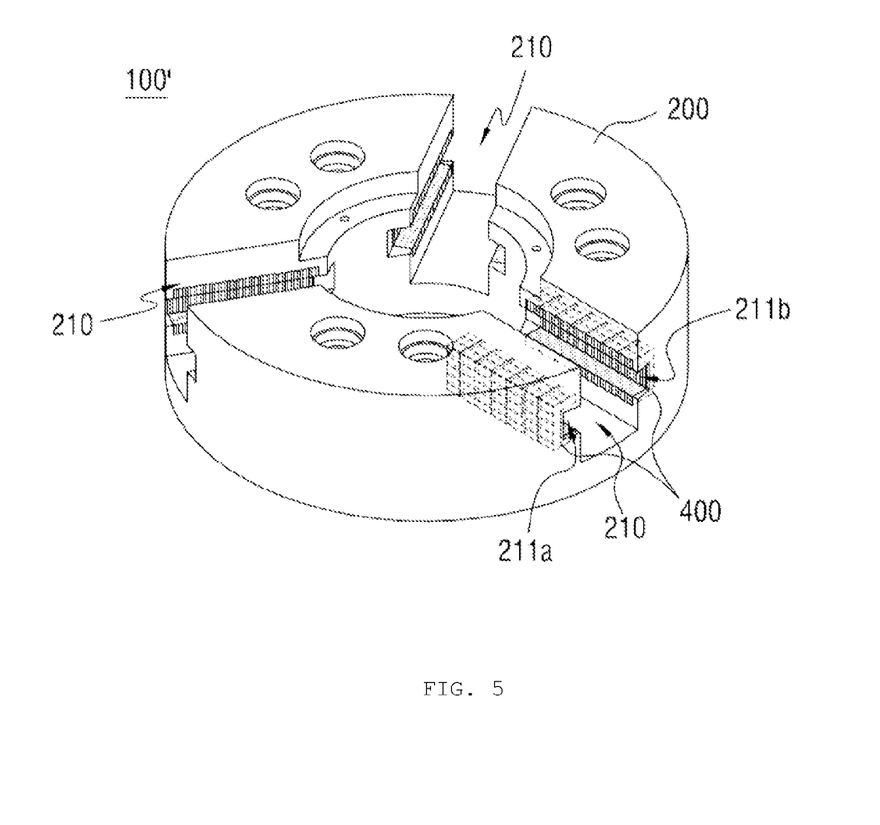
FIG. 5 is an exploded perspective view of a chuck for mounting a workpiece according to a second embodiment of the invention.
Figure 6:
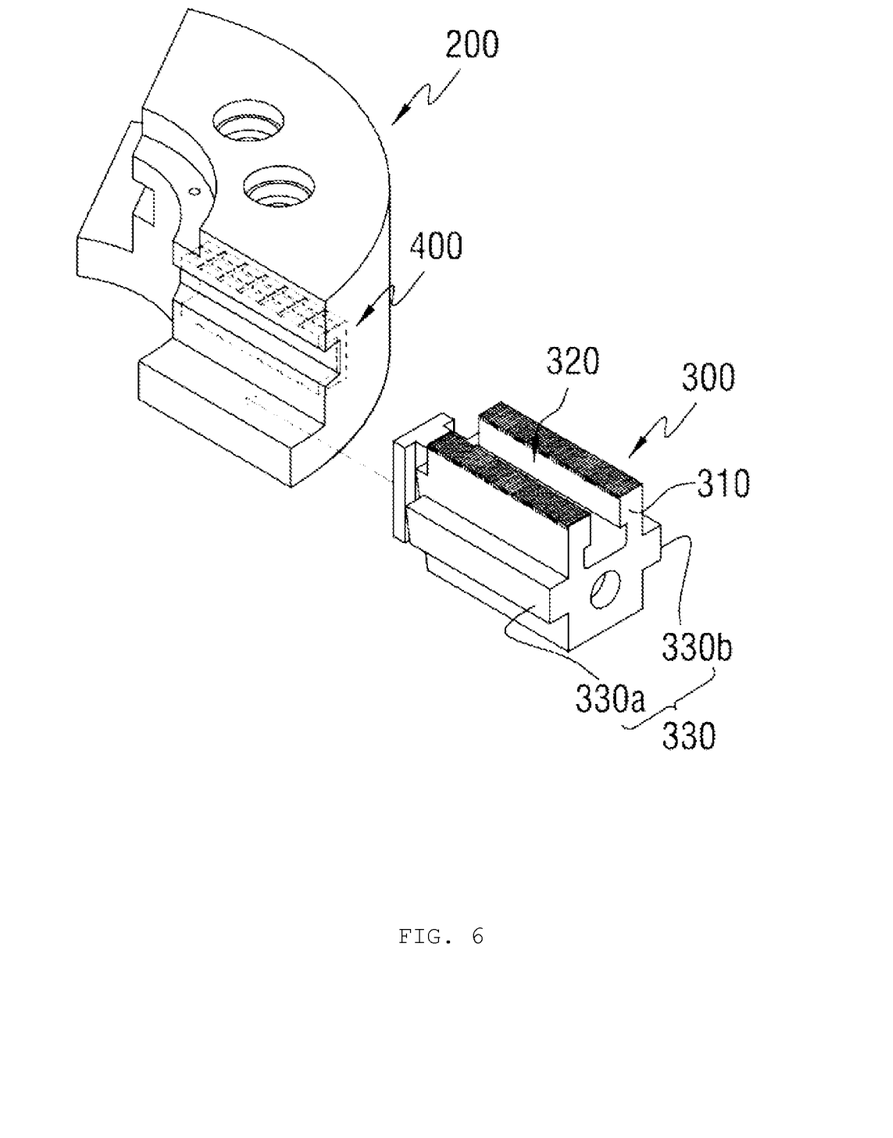
FIG. 6 is an exploded perspective view illustrating a part of FIG. 5.

FIG. 5 is an exploded perspective view of a chuck for mounting a workpiece according to a second embodiment of the invention. FIG. 6 is an exploded perspective view illustrating a part of FIG. 5. A chuck for mounting a workpiece according to the second embodiment may be the same as the chuck for mounting the workpiece according to the first embodiment, except contents that will be described in the following descriptions.

First, referring to FIG. 5 and FIG. 6, a chuck 100' for mounting a workpiece according to the second embodiment of the invention includes a chuck body 200 and a base jaw (base jaws) 300. The chuck body 200 is installed at a predetermined end of a main spindle and is rotated along with the main spindle. The base jaw 300 includes a plurality of base jaws 300 on the chuck body 200, and moves in a radial direction on the chuck body 200.

In addition, the chuck body 200 includes at least one guide portion 210 for guiding a movement of the base jaw 300. The guide portion 210 may include a sliding portion 211 for supporting a support portion 330 of the base jaw 300 and guiding the base jaw 300 so that the base jaw 300 can move.

The sliding portion 211 may include a first sliding portion 211*a* positioned at a first side of the guide portion 210 and a second sliding portion 211*b* positioned at a second side of the guide portion 210. The sliding portion 211 of the second embodiment is the same as the sliding portion 211 of the first embodiment, and the detailed descriptions of the sliding portion 211 of the second embodiment will be omitted. Also, the base jaw 300 of the second embodiment is the same as the base jaw 300 of the first embodiment, and the detailed descriptions of the base jaw 300 of the second embodiment will be omitted.

In this instance, the chuck 100' for mounting the workpiece according to the second embodiment of the invention includes a reinforcement portion 400 at a predetermined area of the sliding portion 210.

As described in the above, the chuck body 200 may include an aluminum alloy.

Although the chuck body 200 having the aluminum alloy can be lightweight, abrasion of the chuck body 200 having the aluminum alloy may be generated since the aluminum alloy has a relatively low strength or stiffness.

Therefore, the chuck 100' for mounting the workpiece according to the second embodiment of the invention includes the reinforcement portion 400 at the predetermined area of the sliding portion 211. By the reinforcement portion 400, the strength or the stiffness of the sliding portion 211 can be reinforced.

That is, the greatest load applied to the sliding portion 211 among the chuck body 200 when the base jaw 300 moves. Thus, by including the reinforcement portion 400, the sliding portion 211 can bear the load applied to the sliding portion 2110 when the base jaw 300 moves.

In this instance, in order to reinforce the strength or the stiffness, the reinforcement portion 400 may include stainless steel, alloy steel for machining structural use, or carbon steel for machine structure use that is a material of the conventional chuck.

Hereinafter, with reference to FIG. 7 and FIG. 8, the reinforcement portion 400 according to the invention will be described in detail.

Figure 7:
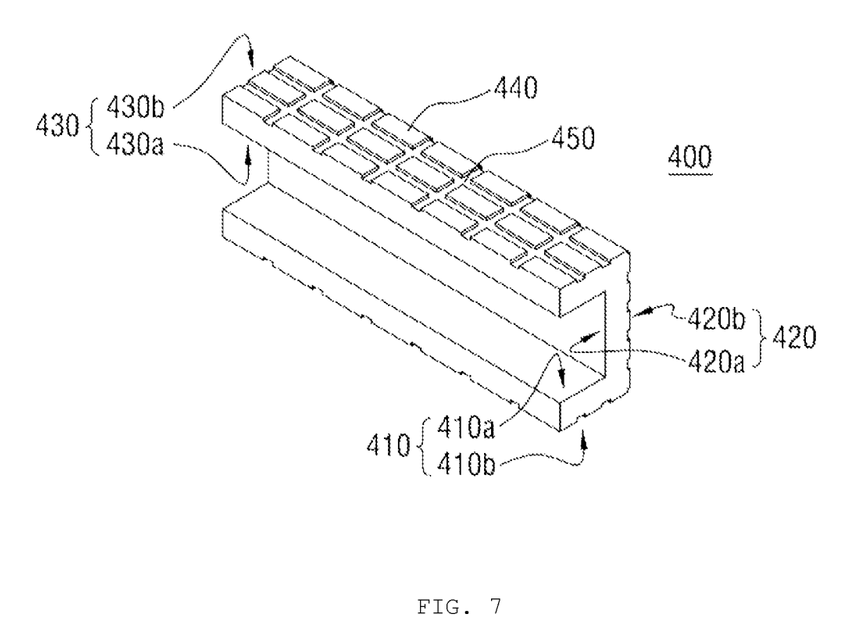
FIG. 7 and FIG. 8 are perspective views of an example of a reinforcement portion of a chuck for mounting a workpiece according to the invention.
Figure 8:
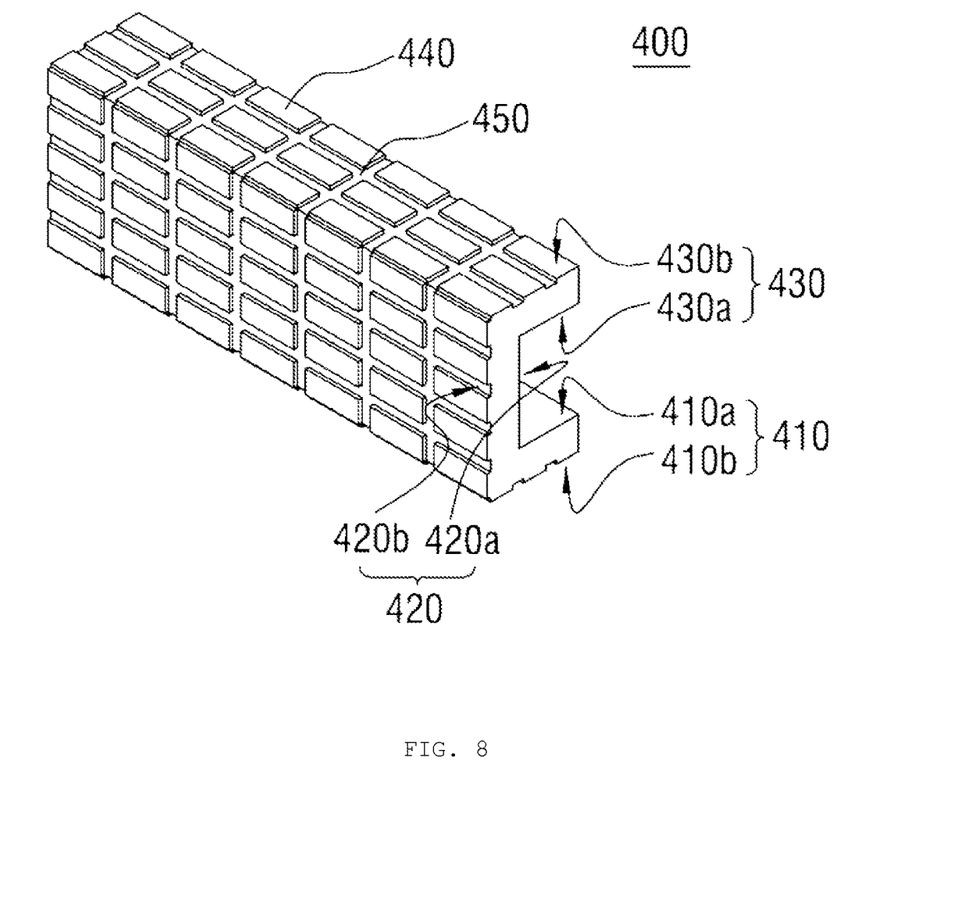

FIG. 7 and FIG. 8 are perspective views of an example of a reinforcement portion of a chuck for mounting the workpiece according to the invention. For the convenience of the descriptions, exploded perspective views in different directions are shown in FIG. 7 and FIG. 8.

Referring to FIG. 7 and FIG. 8, the reinforcement portion 400 of the chuck for mounting the workpiece according to the invention may include first reinforcement portions 410 and 430 and a second reinforcement portion 420. Each of the first reinforcement portions 410 and 430 and the second reinforcement portion 420 has an inner side surface and an outer side surface.

The first reinforcement portions 410 and 430 may be horizontal reinforcement portions, and the second reinforcement portion 420 may be a vertical reinforcement portion. However, in the invention, the terms of horizontal and vertical are just for the convenience of the descriptions, and the invention is not limited to the meanings of the terms.

More particularly, the first reinforcement portions 410 and 430 may include a first horizontal reinforcement portion 410 and a second horizontal reinforcement portion 430. The first horizontal reinforcement portion 410 is connected to one side of the second reinforcement portion, that is, the vertical reinforcement portion 420, and the second horizontal reinforcement portion 430 is connected to the other side of the vertical reinforcement portion 420.

That is, by the first horizontal reinforcement portion, the vertical reinforcement portion, and the second horizontal reinforcement portion continuously connected to each other, the reinforcement portion according to the invention has an approximate or about "U" shape.

In this instance, the reinforcement portion according to the invention having the approximate or about "U" shape is for increasing a contact area with the support portion 330 of the base jaw 300.

More particularly, the support portion 330 includes the first support portion 330*a* extended or protruded from a first side of the body portion 310 and the second support portion 330*b* extended or protruded from a second side of the body portion 310. The base jaw 300 moves along the guide portion 210 in a state that the first support portion 330*a* of the base jaw 300 is in contact with the first sliding portion 211*a* and the second support portion 330*b* of the base jaw 300 is in contact with the second sliding portion 211*b*.

In this instance, when the support portion 330 is in contact with the sliding portion 211, three contact surfaces (a lower surface, an upper surface, and a side surface) of the support portion 330 is in contact with the sliding portion 211. Thus, the reinforcement portion 400 has the approximate or about "U" shape in order to reinforce the abrasion at the three contact surfaces.

Therefore, in the invention, the shape of the reinforcement portion 400 may be varied considering the contact state between the support portion 330 and the sliding portion 211. Therefore, the invention is not limited to the shape of the reinforcement portion 400.

In addition, the reinforcement portion has the approximate or about "U" shape by the first horizontal reinforcement portion, the vertical reinforcement portion, and the second horizontal reinforcement portion continuously connected to each other is exemplified in FIG. 7 and FIG. 8.

Unlike this, the reinforcement portion may have the approximate or about "U" shape by the first horizontal reinforcement portion, the vertical reinforcement portion, and the second horizontal reinforcement portion that are not continuously formed.

That is, the separated first horizontal reinforcement portion, vertical reinforcement portion, and second horizontal reinforcement portion may be disposed at predetermined areas of the sliding portion 211.

Further, the reinforcement portion including the first horizontal reinforcement portion, the vertical reinforcement portion and the second horizontal reinforcement portion is exemplified in FIG. 7 and FIG. 8. Unlike this, in the invention, the reinforcement portion may include at least one of the first horizontal reinforcement portion, the vertical reinforcement portion, and the second horizontal reinforcement portion.

Meanwhile, the first horizontal reinforcement portion 410 includes an inner side surface 410a of the first horizontal reinforcement portion 410 and an outer side surface 401b of the first horizontal reinforcement portion 410. The second horizontal reinforcement portion 430 includes an inner side surface 430a of the second horizontal reinforcement portion 430 and an outer side surface 430b of the second horizontal reinforcement portion 430. The vertical reinforcement portion 420 includes an inner side surface 420a of the vertical reinforcement portion and an outer side surface of the vertical reinforcement portion 420.

In this instance, each outer side surfaces (that is, the outer side surface 410b of the first horizontal reinforcement portion 410b, the outer side surface 430b of the second horizontal reinforcement portion 430, and the outer side surface 420b of the vertical reinforcement portion 420) may include depressed portions 450 and protruded portions 440 for a solid connection between the sliding portion 211 and the reinforcement portion 400.

That is, the contact area between the sliding portion 211 and the reinforcement portion 400 increases by the depressed portions 450 and the protruded portions 440. Accordingly, the solid connection between the sliding portion 211 and the reinforcement portion 400 can be maintained through the increased contact area.

Figure 9:
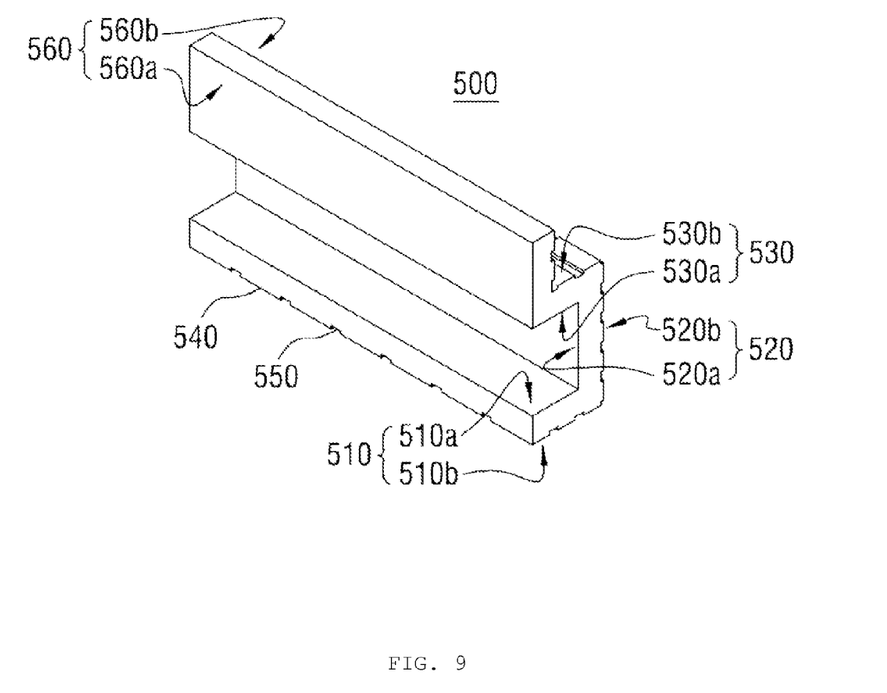
FIG. 9 is a perspective view of another example of a reinforcement portion of a chuck for mounting a workpiece according to the invention.

FIG. 9 is a perspective view of another example of a reinforcement portion of a chuck for mounting a workpiece according to the invention. A reinforcement portion of a chuck for mounting a workpiece shown in FIG. 9 may be the same as the reinforcement portion of the chuck for mounting the workpiece shown in FIG. 4, except contents that will be described in the following descriptions.

As described in the above, the reinforcement portion having the first horizontal reinforcement portion, the vertical reinforcement portion, and the second horizontal reinforcement portion is exemplified in FIG. 4. Unlike this, in the invention, the reinforcement portion may include at least one of the first horizontal reinforcement portion, the vertical reinforcement portion, and the second horizontal reinforcement portion.

Also, as shown in FIG. 9, the reinforcement portion 400 may include a first horizontal reinforcement portion, a first vertical reinforcement portion, a second horizontal reinforcement portion, and a second vertical reinforcement portion.

That is, the first reinforcement portion may include the first horizontal reinforcement portion 510 and the second horizontal reinforcement portion 530, and the second reinforcement portion may include the first vertical reinforcement portion 520 and the second vertical reinforcement portion 560.

In this instance, the first horizontal reinforcement portion 510 may be connected to one side of the first vertical reinforcement portion 520, and one side of the second horizontal reinforcement portion 530 may be connected to the other side of the first vertical reinforcement portion 520.

Further, the other side of the second horizontal reinforcement portion 530 may be connected to one side of the second vertical reinforcement portion 560.

In addition, the first horizontal reinforcement portion 510 may include an inner side surface 510a of the first horizontal reinforcement portion 510 and an outer side surface 510b of the first horizontal reinforcement portion 510. The second horizontal reinforcement portion 530 include an inner side surface 530a of the second horizontal reinforcement portion 530 and an outer side surface 530b of the second horizontal reinforcement portion 530b. The first vertical reinforcement portion 520 may include an inner side surface 520a of the first vertical reinforcement portion 520 and an outer side surface 520b of the first vertical reinforcement portion 520. The second vertical reinforcement portion 560 may include an inner side surface 560a of the second vertical reinforcement portion 560 and an outer side surface 560b of the vertical reinforcement portion 560.

Therefore, in the invention, the shape of the reinforcement portion 400 may be varied considering the contact state between the support portion 330 and the sliding portion 211. Therefore, the invention is not limited to the shape of the reinforcement portion 400.

According to an embodiment of the invention, a chuck body includes an aluminum alloy having specific gravity smaller than that of alloy steel for machining structural use or carbon steel for machine structure use. Thus, the chuck can be light weight.

Accordingly, a size and an installation space of the apparatus (the machine tool) can be reduced by a reduced weight of the chuck. The load applied to the apparatus can be reduced, and thus, power consumption can be reduced and lifespan of the apparatus can be increased.

In addition, a reinforcement portion positioned at the predetermined area of a sliding portion is included. Therefore, strength or stiffness of the sliding portion can be increased by the reinforcement portion.

On the other hand, as in the second embodiment, by including the reinforcement portion positioned at the predetermined area of the sliding portion, the strength or the stiffness of the sliding portion can be reinforced by the reinforcement portion. Also, an aluminum oxide layer may be formed by an outer surface of the chuck body, thereby reinforcing the strength or the stiffness.

For example, after forming the chuck body of the chuck for mounting the workpiece according to the first embodiment, the aluminum oxide layer may be formed at the outer surface of the chuck body.

Hereinafter, an example of a method for forming the aluminum oxide layer on the chuck body will be described. However, this is just an embodiment of the invention. Thus, the aluminum oxide layer may be formed at the outer surface of the chuck body by using known methods for forming the aluminum oxide layer.

First, the chuck body including the aluminum alloy is dipped to an aqueous solution.

A first aqueous solution is an aqueous solution including at least one of a sulfuric acid, an oxalic acid, and a phosphoric acid by an amount of 15 to 30 wt %.

Next, a DC voltage of 60 to 80V is applied to the chuck body dipped to the first aqueous solution for 40 to 50 minutes while the chuck body is dipped into the aqueous solution, thereby forming an oxide layer.

A plating or a coating of another metal to the aluminum alloy may be difficult, and it may be difficult to increase a thickness of a natural layer above the certain thickness. Thus, in the embodiment, an oxide (that is, the aluminum oxide layer) having a certain thickness is formed by using the electrical method.

The aluminum oxide layer is a thin layer of an oxide formed on a surface of a metal through a chemical reaction. The aluminum oxide has a high electrical resistance, has large hardness and enhanced durability of abrasion, and has excellent corrosion resistance.

And then, when the aluminum oxide layer is colored by using colored dye, a ground color of the chuck body is also colored.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A chuck for mounting workpiece, comprising:
    a chuck body made of an aluminum alloy and comprising at least one guide portion;
    a reinforcement portion disposed in the chuck body and including an inner side surface which forms a sliding portion; and
    a base jaw mounted on the chuck body and including a body portion disposed in the at least one guide portion and a support portion protruded from the body portion and disposed in the sliding portion,
    wherein the reinforcement portion comprises the inner side surface directly contacting with the support portion and an outer side surface directly contacting with a surface of the chuck body,
    wherein the outer side surface includes a repeated pattern formed by a plurality of depressed portions and a plurality of protruded portions, and both of the plurality of depressed portions and the plurality of protruded portions are in direct contact with the surface of the chuck body such that a contact area between the chuck body and the outer side surface increases,
    wherein the surface of the chuck body directly contacting with the outer surface is formed of the aluminum alloy, and
    wherein a distal end of the reinforcement portion in a radial direction of the chuck body, which is disposed adjacent to an outer circumferential surface of the chuck body, is positioned inside the chuck body and covered by the chuck body without being exposed to the outer circumferential surface of the chuck body.

2. The chuck according to claim 1, wherein the reinforcement portion comprises a first reinforcement portion and a second reinforcement portion, and
    each of the first reinforcement portion and the second reinforcement portion comprises the inner side surface and the outer side surface.

3. The chuck according to claim 2, wherein the first reinforcement portion comprises a first horizontal reinforcement portion and a second horizontal reinforcement portion,
    the second reinforcement portion comprises a vertical reinforcement portion,
    the first horizontal reinforcement portion is connected to one side of the vertical reinforcement portion, and
    the second horizontal reinforcement portion is connected to the other end of the vertical reinforcement portion.

4. The chuck according to claim 1, further comprising:
    an aluminum oxide layer formed on an outer surface of the chuck body.

5. The chuck of claim 1, wherein a bottom of the body portion of the base jaw is in direct contact with a bottom surface of the at least one guide portion, the bottom surface being formed of the aluminum alloy.

6. The chuck of claim 1, wherein the reinforcement portion is made of stainless steel, alloy steel, or carbon steel.

7. The chuck of claim 1, wherein the repeated pattern is in a lattice shape.

* * * * *